United States Patent [19]

Hershkovitz

[11] Patent Number: 5,590,990
[45] Date of Patent: Jan. 7, 1997

[54] TOOL FOR WORKING MATERIALS ON WORKPIECES, PARTICULARLY FOR MANUAL DEBURRING

[75] Inventor: David Hershkovitz, Nahariya, Israel

[73] Assignee: Vargus Ltd., Nahariya, Israel

[21] Appl. No.: 305,484

[22] Filed: Sep. 13, 1994

[30] Foreign Application Priority Data

Sep. 13, 1993 [DE] Germany .......................... 43 30 879.1

[51] Int. Cl.[6] .............................. B23D 9/00; B26B 3/00
[52] U.S. Cl. ................................. 409/303; 30/170
[58] Field of Search .................... 409/297, 298, 409/300, 303, 308; 30/169, 170, 171, 172, 317

[56] References Cited

U.S. PATENT DOCUMENTS

| | | | |
|---|---|---|---|
| 1,292,461 | 1/1919 | Hartmann | 30/171 |
| 1,447,039 | 2/1923 | Rhodes | 30/171 |
| 2,882,594 | 4/1959 | Long | 30/170 |
| 3,327,588 | 6/1967 | Yandell | 409/297 X |
| 3,621,571 | 11/1971 | Gern | 30/169 |
| 3,751,804 | 8/1973 | Pulrang | 30/169 |
| 3,787,972 | 1/1974 | Carossino | 30/317 |
| 3,895,439 | 7/1975 | Ehrenberg et al. | 30/171 |
| 4,455,747 | 6/1984 | Carossino | 30/171 |
| 4,504,178 | 3/1985 | Seidenfaden | 409/138 |
| 4,884,343 | 12/1989 | Sewell | 30/169 |

FOREIGN PATENT DOCUMENTS

| | | | |
|---|---|---|---|
| 953182 | 12/1949 | France | 30/170 |
| 2166839 | 3/1976 | Germany . | |
| 557934 | 5/1977 | U.S.S.R. | 30/169 |
| 21666 | 10/1908 | United Kingdom | 30/170 |
| 887742 | 1/1962 | United Kingdom | 30/170 |

Primary Examiner—William R. Briggs
Attorney, Agent, or Firm—Quarles & Brady

[57] ABSTRACT

A deburring device is provided in the advance direction with a support roll preceding the deburring tool and which together with the latter acts in such a way with respect to the workpiece edge to be deburred during the advance movement in track-guiding manner so that it is possible to have lateral tilting and displacement movements of both working members with respect to the workpiece edge, which greatly facilitates working with the tool.

39 Claims, 2 Drawing Sheets

TOOL FOR WORKING MATERIALS ON WORKPIECES, PARTICULARLY FOR MANUAL DEBURRING

BACKGROUND OF THE INVENTION

The invention relates to a tool enabling finer material working operations, optionally without the aid of mechanical or motor driving forces, to be carried out on metal surfaces or surfaces having similar characteristics. Such working operations can be performed in a cutting and/or non-cutting manner, as well as for producing finer notches, grooves, flattenings/smoothings or chamfers/roundings in the vicinity of the workpiece edges.

On working with such tools, particular importance is paid to the setting angle of the working surfaces engaging in the workpiece with respect to the workpiece in working or machining engagement, so that according to the invention the working head which is much shorter than the remaining tool is supported on at least two spaced points with respect to the workpiece and in which at least two of these points, instead of being positioned at right angles to the advance direction, are juxtaposed in succession in the advance direction and have a spacing of approximately 5 to 30 mm or a minimum of 15 and a maximum of 20 mm from one another.

It is also conceivable to construct a leading supporting or working surface in the advance direction with sides or flanks in such a way that they are guided in track-true, clearance-free manner on two workpiece surfaces which are at an angle to one another and define the workpiece edge to be worked in such a way that sideways directed transverse movements around the workpiece edge are not possible, without removing the correct supporting or working engagement of at least one of the working surfaces, particularly the trailing supporting or working surface. This leads to the disadvantage that the particular working surface, e.g. in the case of hooking with respect to the workpiece cannot be transferred sideways into a slightly displaced or tilted position and thus overcoming the inhibiting of movements in the advance direction resulting from the hooked together engagement.

In addition, such a construction does not make it possible to produce surface profiles on the workpiece, which diverge from the working profile of the working surface, because said profile is not displaced transversely to the advance direction at approximately to the working plane or its working plane cannot be tilted transversely to the advance direction with respect to the workpiece.

If the particular working surface, particularly a supporting surface, is formed by a sliding surface, the terminal edge thereof can easily become hooked with respect to the workpiece and there is also a relatively high friction between the workpiece and the supporting surface and which, like the machining surface for performing completely satisfactory machining, must be pressed relatively strongly against the workpiece. If the working head or a working member forming the particular working surface, such as a tool or supporting member, has a relatively large extension at right angles to the working plane, unfavourable strength conditions arise and also the working or machining area cannot or can only with-difficulty be monitored by the person operating the tool.

OBJECTS OF THE INVENTION

An object of the invention is to create a tool of the aforementioned type, which avoids the disadvantages of known constructions of the described type and which in particular permits an easy working or machining with relatively small forces in the advance direction, e.g. in that the working or supporting zone engaging in the workpiece can be displaced with respect to the latter without leaving the engagement.

SUMMARY OF THE INVENTION

According to the invention, the supporting area of the tool defined by at least two points is so constructed that at least one supporting area can be positionally modified sideways and transversely with respect to the workpiece without raising or setting down said supporting area or a further supporting area and this preferably takes place in stepless manner. The position change can be a linear movement roughly parallel to the working plane and at right angles to the advance direction or a rotary movement and/or a tilting movement of the working plane about an axis roughly parallel to the advance direction. The particular working surface can consequently be brought into different setting positions with respect to the workpiece surface, so that e.g. initially on a workpiece edge can be produced an edge chamfer and subsequently said chamfer can be further worked to a roughly quadrant-shaped rounding or a polygonal chamfer.

Furthermore, sideways connecting portions of the same working surface can be successively brought into engagement with the workpiece, so that an area which has become hooked up or blunt due to wear can be disengaged in favor of a more suitable area.

At least one working surface or at least one supporting or machining surface forms a track guide for the working head roughly parallel to the advance direction in the sense that on pressing the same against the workpiece it tends to orient the working head or itself transversely to the advance direction with respect to the workpiece, because due to the pressed engagement corresponding transverse forces are caused. Such a track face can e.g. be a V-shaped and/or concavely rounded, recessed face, which compared with the two opposite surfaces of the workpiece which are usually at right angles to one another is so constructed that on engagement on one of said opposite faces it does not engage on the other opposite face and is instead spaced therefrom. For this purpose the flank angle of the working face is appropriately at least 20 or at the most 60° and in particular approximately 40° larger than the angle between the opposite faces of the workpiece.

On the one hand this ensures a track guidance and on the other the sideways directed movement freedom of the particular working face with respect to the workpiece, so that the particular working face frees during the machining engagement track and engagement positions displace sideways transversely to the advance direction or relative to the workpiece and said engagement positions follow onto one another in an uninterrupted manner. The working face which is in engagement can serve as a fulcrum for a further working face, which is rotatable about an axis at right angles to the working plane or in spaced working faces can be simultaneously rotated about an axis at right angles to the working plane and between said working faces.

In a view transverse to the working plane between adjacent working faces or their contact faces with the workpiece is provided a contact face-free space for engagement in a workpiece, the spacing between said working or contact faces or contact points being roughly the same as the working width of the tool or is smaller than twice this. The said spacing is appropriately variable with an adjusting device and such an adjusting device can also be used for varying the setting angle of the machining surface with respect to the working plane.

Independently of the described construction it is advantageous if at least one of the working faces is freely movable at least between end positions in the engagement state with the workpiece in one or more directions transverse to one another and/or if one of these working faces in the said state is positionally rigid with respect to the body. In particular the supporting surface can be freely movable backwards and forwards at right angles to the advance direction and/or roughly parallel to the working plane between stop-limited end positions, so that the position of the machining surface can be still better adapted to the particular circumstances with respect to the workpiece.

The supporting surface can also be constructed as a bearing surface, particularly as a rolling surface movable roughly in the advance direction, which ensures a very easy action operation during the displacement of the supported tool with respect to the workpiece. The mobility takes place in self-adapting manner in that said supporting surface acts in a track-centring manner and is automatically aligned in the most favourable position with respect to the opposite faces of the workpiece.

Through a working face around a single axis or spherically curved there is advantageously obtained an only linear or punctiform engagement on the workpiece, so that even with a non-rotating construction of a supporting member a very easy action is ensured and said tilting movements are facilitated. If the working face is curved in two planes at right angles to one another, namely e.g. concave in a plane transverse to the advance direction and to the working plane and convex in a plane at right angles thereto and to the working plane and roughly parallel to the advance direction, there is a further improvement to the guidance of the supporting or bearing surface.

The concave curvature can at least partly be formed by approximately linear, obtuse-angled, V-shaped flanks in said cross-section, such as occur on the circumference of a roll body, which has approximately two identically long or identically large frustum-shaped longitudinal portions, which with their narrower ends are so connected to one another that in the deepest area of the working face is formed a notch or a free notch. With said notch the supporting surface can run directly on the workpiece edge and in the case of a free notch the supporting surface runs on either side of the workpiece edge in linear or punctiform manner directly on the workpiece opposite faces. The movable working or supporting body is appropriately mounted with a bearing, which in the same way as a sliding bearing, forms a bearing gap, which is bounded by two faces movable against one another. The largest diameter of the supporting body can be roughly the same as its length, whereas its smaller diameter compared therewith is appropriately at least half of this.

However, it is also conceivable to construct one, two or more working faces integrally with the body, particularly if the latter is made from a material, such as steel or hardened steel which is harder than the material to be worked, so that the working faces are formed through said material. At least two, spaced working faces are interconnected by means of a connecting part of the body, which can form a receptacle for the particular working body if the latter is not integrally constructed therewith. The said connecting part can also be in two portions, each portion carrying at least one working face and said portions being adjustable against one another for the separate adjustment of the working faces with respect to one another and using at least one adjusting device.

For example, the two portions can engage over one another transversely to the working plane or approximately parallel to the advance direction and in the overlapping region are mutually adjustable by a fixable sliding guide and/or a fixable joint or joint zone. The connecting part or its portions are preferably constructed in a substantially flat, strip-plate manner and can be located in a plane roughly parallel to the working plane or the median longitudinal axis of the body and which preferably forms an acute angle opening in the advance direction or towards the holder with the working plane. On the side of a working face remote from the holder the connecting part is appropriately offset, e.g. by means of an offset in the direction of the working plane, so that its distance from the latter is relatively small and there is a high positional stability of the working face located in this area.

Optionally including the receptacles for one or more working bodies, the connecting part can be constructed integrally in the manner of a stamped bent part from sheet metal or the like, which instead of having a deep drawing-like deformation only has simple bends for non-cutting shaping, which ensures a very easy manufacture of the head part of the body belonging to the working head.

Independently of the described construction it can also be appropriate to construct at least one supporting or tool member roughly parallel to the working plane in rod or plate-like manner instead of in rod-like manner at right angles to the working plane, so that with relatively large surfaces it can be supported against loads transversely to the working plane on the head part of the body. In addition, the tool member can be fixed against the head part by tensioned fastening members, e.g. bolts. If the particular fastening member partly traverses the tool member, then its head which is widened compared with a screwed shank or the like is appropriately either substantially counter-sunk within the tool member or within the head part.

The fastening members roughly parallel to the working plane or the fastening plane of the tool member can in one or up to all directions have so much clearance with respect to the tool member or head part that within said clearance the tool member can be adjusted in stepless manner with respect to the head part and can then be fixed. The particular fastening member can also act in substantially clearance-free centring manner, so that there is a very accurate, predetermined orientation of the associated working face with respect to the head part of the body. In a view at right angles to the working plane, said head part does not or only slightly projects sideways over the working width of the particular working face, so that in the advance direction it does not or only insignificantly projects over the associated, outermost working member.

In a view of the working plane the extension of at least one working member in at least one to all the areas at right angles to the advance direction is larger, e.g. roughly twice as large than parallel to the advance direction, so that the working area can always be readily examined from the outside. The extension of a working or tool member at right angles to the working plane is also smaller than that of a further working or supporting member or than the height or thickness of the head part in the vicinity of said supporting surface.

Also independently of the described constructions, at least one working member can be constructed as a turning member, which after wear or the like in the vicinity of a working zone can be so adjusted or turned with respect to the body that a further working area is made available. In .the case of cutting or scraping edges two such edges can be bounded roughly parallel to one another by a common face and said edges can be roughly parallel to and/or at right angles to the working plane in spaced manner. The tool member can have two roughly parallel or planar plate faces, whereof one serves as a supporting face for the engagement on the body and can be smaller in one edge direction than the other, so that there is e.g. a trapezoidal cross-section of the working member with planar and/or curved lateral flanks. Thus, in cross-section, the particular working or engagement edge can be easily given an acute-angled construction.

Also independently of the described construction, one of the supporting or machining surfaces can also be provided for non-cutting working or machining and the tool is only constructed e.g. for such a non-cutting working. However, there can also be a leading cutting working and/or trailing non-cutting working, particularly a smoothing working by sliding or rolling pressure with a corresponding smooth or hard working surface, which can e.g. be formed by a supporting surface. As a result of the smoothing action a relatively fissured burr can be so premachined that subsequently the cutting working can be significantly facilitated.

As described relative to the supporting or smoothing surface, at least one cutting working surface can be profiled and in the advanced direction there can be two spaced following or cutting working surfaces, whereof e.g. the leading surface optionally preworks in a coarser or finer manner, whereas the trailing surface performs a finishing operation. The non-destructively, easily replaceable tool member can also have separate working zones for different materials, workpiece diameters, etc., the tool being in particular suitable for working or machining diameters between 20 and 100 mm, particularly beween 40 and 50 mm.

Preference is given to the fact of only having two punctiform or linear supporting or engagement areas in the advance direction, so that the support of the tool with respect to the workpiece in a view of the working plane at least takes place in the vicinity of the angles of a right-angled triangle, whose base line coincides with the cutting edge of the tool member and whose apex positioned in front of this in the advance direction coincides with a support point of the supporting surface.

Compared with an also providable construction of the tool for a pushing guidance during machining preference is given to a construction for pulling guidance, so that the holder constructed as a grip or handle is positioned upstream of the working head in the advance direction and is connected thereto by means of a rod-like, thin shank, which appropriately only extends up to the end of the head part facing the holder or at the most up to the furthest forward supporting face or the furthest forward supporting body. By pivoting the holder at right angles to the working plane the head part can be rolled on the furthest forward supporting surface and consequently the engagement depth of the trailing machining surface can be modified. By modifying the spacing between the particular working face and the holder, in advantageous manner the tool can be adjusted to different workpiece sizes or diameters. Such an adjustability can e.g. be gathered from U.S. Pat. No. 3,787,972, German patent 21 66 839 and from U.S. Pat. No. 3,895,439, to which reference should be made for further features and actions and whose teachings are incorporated into the present invention.

BRIEF FIGURE DESCRIPTION

These and further features can be gathered from the claims, description and drawings and the individual features, both singly or in the form of subcombinations, can be realized in an embodiment of the invention and in other fields and can represent advantageous, independently protectable constructions for which protection is hereby claimed. An embodiment of the invention is described in greater detail hereinafter relative to the drawings, wherein show:

DETAILED DESCRIPTION OF PREFERRED EXAMPLE EMBODIMENTS

Figure 1:
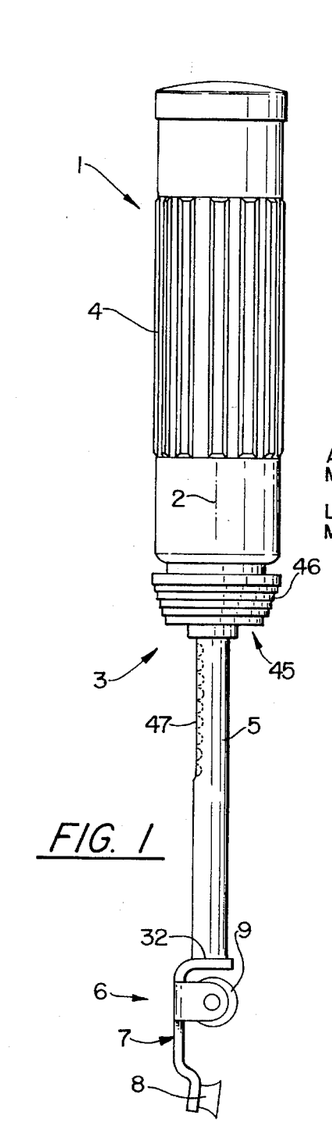
FIG. 1 A tool according to the invention in side view.

The rod-like tool 1 extending along a median longitudinal axis 2 has a corresponding rod-like body 3, which is provided at one end with an elongated grip or holder 4 located in the axis 2 for engagement round with a hand and for transferring the advance and orientation forces. To one end of said holder 4 is connected a much thinner shaft 5 formed by a cylindrical, linear rod and which at the end remote from the holder 4 carries a slightly widened working head 6, which in a longitudinal view can be essentially located within the envelope surface of the grip 4.

Figure 2:
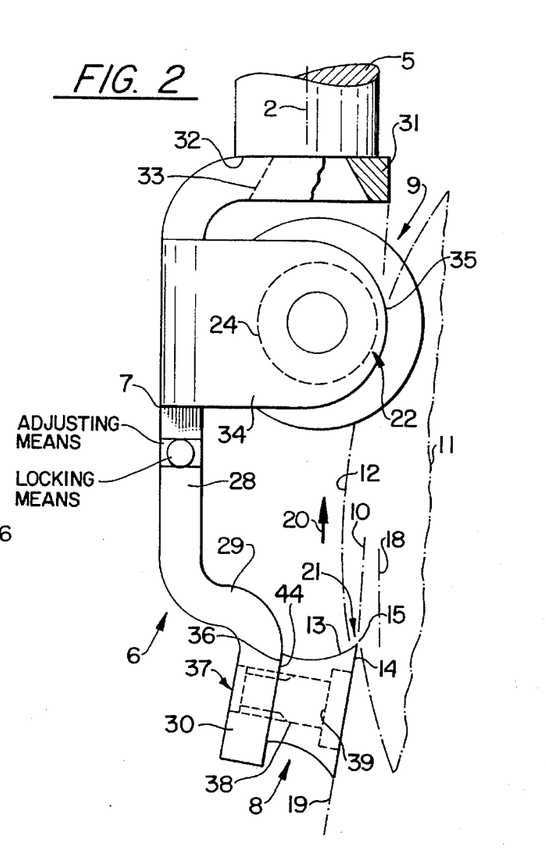
FIG. 2 A detail of FIG. 1 on a larger scale and in the machining or working state.
Figure 3:
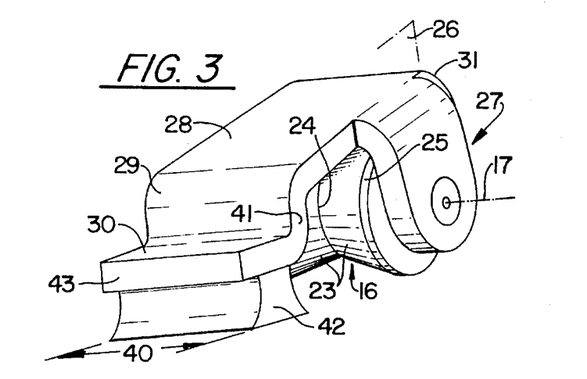
FIG. 3 The working head of the tool in a perspective representation.

In the vicinity of the working head 6 the body 3 forms a head part 7 connected in positionally rigid manner to the shaft 5 and which is made from sheet metal or the like with a material thickness of less than 2 mm and which has a substantially constant thickness over its entire extension. At the end remote from the holder 4 or shaft 5 the head part 7 carries on a plate surface linking the edge faces a working member 8 in the form of a cutting member. Closer to the components 4 or 5 and immediately adjacent to the associated end of the shaft 5, the head part 7 carries a further working member 9 in the form of a supporting member, which has a greater distance from the working member 8 than from the associated end of the shaft 5, is located on the same side of the head part 7 as the working member 8 and projects in the direction of said side further over the median axis 2 than the working member 8.

However, to this side the working member 9 projects over the median axis 2 by less than the diameter of radius of the shaft 5, so that it is set back with respect to the associated generatrix of the holder 4 and in a longitudinal view is congruent to the shaft 5 over most of its radial extension. For working purposes the tool 1 with the working head 6 is applied to the workpiece edge 12 of a workpiece 11 in such a way that the two working members 8, 9, spaced from one another, engage with the workpiece edge 12. If the contact points formed by the working members 8, 9 are then connected to the workpiece, then a working plane 10 is obtained, which is provided at an angle of a few radians to the median axis 2 opening towards the holder 5, the working plane 10 being substantially located on the side of the median axis 2 remote from the head part 7.

In a longitudinal view the height extension of the working member 8 directed at right angles to the working plane 10 is located within the associated extension of the shaft 5 or the working member 9, whereas the extension of the working member 8 directed parallel to the working plane 10 can be larger than that of the working member 9, but is appropriately smaller than that of the holder 4, which can e.g. have a diameter of approximately 20 mm and a length of approximately 90 mm.

The working member 8 forms a working face 13 facing the components 4, 5, 9, which extends as an elongated strip face transversely or at right angles to the median axis 2 and with its narrower extension transversely to the working plane 10. On the working side of the tool or that remote from the head part 7 and therefore facing the workpiece edge 12 a further working face 14 is connected at an acute angle to the working face 13 and is also substantially through planar in an elongated, strip-like manner over the associated extension of the working member 8. The working faces 13, 14 form a working edge 15 in the form of a cutting edge roughly parallel to the working plane 10 and transverse or at right angles to the median axis 2.

On the side remote from the components 4, 5, 9 the working member 8 forms a further working face, which corresponds to the working face 13 and forms with the working face 14 a further working face, which can be brought into the working position by turning the working member 8 about an axis positioned transversely to the working plane 10. The two working faces 13 or the two working edges 15 can be identical or different with respect to their angle or profiling and are therefore suitable for different purposes. However, appropriately, the particular working edge 15 is constructed in a through-linear and uninterrupted-linear manner over the entire transverse extension of the working member, so that in each area the same action is exerted.

In a longitudinal view the working faces 13, 14 or the working edge 15 has the extension described relative to working member 8, its transverse extension being appropriately approximately 12 mm. As the working edge 15 is provided as a cutting edge, the working face 13 forms a front cutting face and the working face 15 a back cutting face.

On the single working side of the tool the working member 9 forms a working face 16, which is curved about an axis 17 roughly parallel to the working plane 10 and roughly at right angles to the median axis 2 and is also profiled in longitudinal view or about an axis roughly parallel to the median axis 2. If on the working side a tangential plane roughly parallel to the median axis 2 is applied to the working face 16, then a support plane 18 is obtained, which in cross-section is parallel to the working plane 10, but in side view is at an angle of a few radians with respect thereto and which opens from the working face 16 to the working member 8, the support plane 18 being on the side of the working plane 10 remote from the contact points of the working members 8, 9 or the head part 7. The working member 9 or the working face 16 is formed by an integral roll body, whose rotation axis 17 is formed by said curvature axis.

The working face 14 or the working edge 15 completely exposed to the working side is in a setting plane 19, which is under an acute angle of a few radians to the planes 10, 18 and, emanating from the working edge 15, opens away from the working member, the setting plane 19 being located on the side of the working plane remote from the plane 18 or facing the central axis 2 or the head part 7. The working face 13 is connected under an obtuse angle to the working plane 10. The working plane 10 is e.g. defined in such a way that in it are located the two lateral ends of face 13 or 14 or the working edge 15 and the punctiform contact point of the workpiece edge 12 on the working face 16.

The tool 1 is moved along the workpiece 11 in the advance direction 20 with the components 4, 5, 9 first, so that the working member 8 trails behind the working member 9. The working faces 13, 14 and the working edge 15 only engage on part of the working width of the working member 8 in the workpiece edge 12 in an engagement area 21, whereas the working face 16 engages in the workpiece 11 in a narrower engagement area 22. The distance between the engagement areas 21, 22 is at least as large or greater than the diameter of the shaft 5, the height of the complete working head 6 tranversely to the working plane 10, the transverse, longitudinal and height extension of the working member 8 or 9 and therefore larger than the maximum working width of the working head 6. For example, the spacing can be roughly 2½ times greater than the extension of the working member 8 in the advance direction 20, max. twice as large as the maximum working width of the working face 16 or approximately ⅓ larger than said working width.

In longitudinal view the working face 16 forms a reentrant profile track and support face in that it is formed by two flanks 23 which are at an obtuse angle of approximately 130° to one another towards the centre of the working width and which in cross-section are through linear at right angles to the working plane 10, are at an acute angle to the working plane 10 and are connected to one another in the centre of the working width in the vicinity of a recessed notch 24.

Laterally outwards each flank 23 passes directly into a narrow collar face or a cylindrical collar 25 roughly parallel to the working plane 10 or at an obtuse angle thereto and which in the manner of a chamfer has a width of only roughly 1 mm and is connected to the associated outermost end or front face of the working member 9. The faces 13, 14, 16 and the working edge 15 or the working members 8, 9 are substantially symmetrical to a median longitudinal plane 26 of the working head 6, which can coincide with an axial plane of the median axis 2 and the head part 7 is also substantially symmetrical to said median longitudinal plane 26.

The working member 9 is mounted with a bearing 27 constructed as a casing and which is substantially integral with the head part 7. In the vicinity of the bearing 27 the head part 7 forms a planar mounting plate 28 roughly parallel and through to the plane 10 or 18 and whose planar, smooth-surfaced outside remote from the working side forms the associated outermost boundary of the working head 6, which projects by the plate thickness or two or three times the latter over the associated side of the parts 5, 9. At its end facing the working member 8 the mounting plate 28 passes by means of a double opposite and roughly right-angled bent offset 29 into a shorter mounting plate 30 in the direction of the median axis 2 and which is also roughly parallel to the plane 10, 18 or 19 and which with respect to the mounting plate 28 is displaced by at least the material thickness or twice or three times the same with respect to the working plane 10 or by roughly the associated height of the working member 8.

The distance from the mounting plate 30 to the working face 16 or the axis 17 is greater than the distance thereof from the shaft and from the associated end of the head part 7. The said end is formed by a partition 31 at right angles to the working side or angled in leg-like manner from the mounting plate 28 and whose end projecting only slightly over the circumference of the shaft 5 extends only up to the working plane 10. The end 32 of the shaft 5 engages as an annular face on the larger, planar outer face of the partition 31 in whole-surface manner and is fixed in positionally rigid manner both longitudinally and circumferentially against said outer face by a fastening member 33.

The fastening member 33 constructed integrally with the shaft 5 can be constructed in the manner of a rivet head, which so engages in a corresponding countersunk hole in the partition 31, that it does not or only slightly projects over its inside. The fixing between the shaft 5 and the head part 7 takes place prior to the insertion of the working member 9, which then substantially covers said fixing, because its circumference is located with only a small gap spacing adjacent to the inside of the parttion 31.

From the sides of the mounting plate 28 and/or the partition 31 are angled plate-like, freely projecting, substantially planar bearing brackets 34, which are located with a small gap spacing laterally adjacent to the outsides of the working member 9 and parallel thereto and to one another. These bearing brackets 34 extend at the most up to the outside of the mounting plate 28 and can also be narrower than the lateral outside of the working member 9, only being said small distance from the inside of the partition 31 and their outsides form the lateral outermost boundaries of the working head 6 and the head part 7.

The edge 35 of the bearing bracket 34 facing the working plane 10 is rounded in convex or semicircular manner roughly over its entire width, its' curvature axis being located in the direction of the central axis 2 and/or positioned eccentrically transversely to the working plane 10 with respect to the axis 17. For example, the axis 17 with respect to the curvature axis can be nearer the working plane 10 and/or nearer the working member 8. Thus, in a view parallel to the axis 17, the working member 9 projects over the bearing bracket 34 in an arc angle of more than 90° or 180° relative to the working plane 10, working member 8 and shaft 5. In this view the working member 9 or at least part of the supporting surface 16 in the direction of the working side projects further than the shaft 5 or the complete head part 7 and the partition 31. The two bearing brackets 34 are traversed by aligned bores, in which is firmly inserted a bearing pin formed e.g. by a tubular hollow bolt and which traverses a bore of the sleeve-like working member 9. The working member 9 slidingly rotatably mounted on the bearing member has a stop-limited, sliding bearing clearance between the bearing brackets 34 in the direction of the axis 17.

This bearing clearance is much smaller than the working width of the working members 8, 9 or half or 1/10 of said working width and can be approximately 1 mm, so that without any positional modification of the working member 9 or of the angle of the median axis 10 with respect to the workpiece 11, the working member 8 can be moved sideways relative to the workpiece edge 12.

By its through, planar side remote from and parallel to the working face 14 and which forms a fixing and fastening surface 36, the working member 8 can be fixed to the inside of the mounting plate 30 by a fastening device, which permits a non-destructive detachment and replacement of the working member 8. Other than in the vicinity of this fastening surface 36 the working member 8 is in no contact with the head part 7. For fastening purposes there are two transversely spaced fastening members 37 in the form of setscrews which are remote from the lateral boundary faces of the working member 8 and which pass through the latter in the area of through bores completely closed over the circumference. The shank of the particular fastening member 37 provided with an external thread engages in a tapped hole of the mounting plate 30 constructed as a through hole and can engage with a thread-free centring portion in substantially radial clearance-free manner in a corresponding bore portion of the working member 8, so that the latter is accurately oriented with respect to the head part 7 or the mounting parts 28, 30.

The head 39 of the fastening member 37 having a larger diameter than the shank 38 engages in a countersunk of the working member 8 provided in the working face 14 and is provided on this side with a fastening member, such as a hexagonal recess, so that the fastening of the working member 8 can be released or replaced at any time from said side.

The working width 40 of the working member 8 extends over its entire transverse extension and essentially up to the lateral edges 41 of the mounting parts 30, 28, 31, which can in each case be provided in one plane and over which only projects the particular bearing bracket 34. Thus, the lateral end face 42 of the rod-like working member 18 elongated in the transverse direction terminates substantially flush with the associated lateral edge face 41. The free end edge face 43 of the mounting part 30 can also terminate approximately flush with the associated boundary edge of the fastening face 36 or projects only slightly with respect thereto to the same extent as the unused working edge 15, which is then located roughly in the plane of said face 43. The bearing and fixing face 44 of the mounting part 30 associated with the fastening face 36 is through planar, parallel to the plane 19 and traversed by tapped holes.

For modifying the spacing conditions on the one hand between the engagement areas 21, 22 and on the other between the engagement area 22 and the holding area resulting from the holder 4 an adjusting device 45 is provided, which permits a telescopic displacement of the shaft 5 in the holder 4. A securing member in annular form located in the vicinity of the outlet of the shaft 5 at the associated end of the holder 4 is simultaneously constructed as a handle, which as a result of axial displacement towards the free end of the holder releases the positionally rigid locking of the shaft 5 with respect to the holder 4 in the longitudinal and circumferential directions and in the case of release returns under spring tension towards the locking position.

On its circumferential side remote from the working side, the shaft 5 has a countersunk tooth system 47, which is formed by successive depressions in the longitudinal direction of the shaft 5 in which can be positively locked a locking member, e.g. a ball. This locking member is pressed positively radially inwards into the particular gap of the tooth system 47 by the axial spring-loaded handle 46. When the locking device is released the shaft 5 with the working head 6 can be completely withdrawn from the holder 4 and replaced by another one.

When working with the tool 1 the working edge 15 and working face 16 can be guided in the advance direction 20 along the work-piece edge 12, the working face 16 acting in leading smoothing and track-guiding manner, whereas the working edge 15 scales off a fine chip. Without setting down the working members 8, 9 from the workpiece edge 12 and without cancelling out the track-maintaining action of the working member 9, the working member 8 can be so laterally displaced with respect to the workpiece edge 12 that any random area of its working zone or width 40 or its working edge 15 can be engaged with the edge 12. In any area of this working width there are slightly changed or steplessly varying effective setting angles of the working faces 13, 14 or the working edge 15, so that the most favourable conditions can be chosen. Without detaching the working members 8, 9 from the workpiece edge 12 the working member 9 in corresponding manner can be positionally displaced laterally over the entire working width of its working surface 16 with respect to the workpiece edge 12 without significantly impairing its track-maintaining action or even beyond the collar 25, so that said actions are again obtained.

Each of said components or each of the arrangements can be provided in a tool one or more times, e.g. either in order to bring into and out of engagement different working heads and/or in order to provide more than two engagement areas. The described characteristics can be provided precisely, substantially, approximately or in significantly varying manner in order to adapt the tool to different requirements.

If the spacing between the working faces 13 to 15 and 16 is to be modified, then the head part 7 or the mounting plate 28 can be constructed from two separate components instead of integrally and they are transversely directly adjacent to the working plane 10 and overlap one another in the advance direction 20. The two components can be adjusted relative to one another by means of a sliding guide roughly in the advance direction 20 using an adjusting spindle or the like. The two components can also be pivoted against one another by means of an axis roughly parallel to the working plane 10 or positioned transversely to the advance direction 20 or the median axis 2 parallel thereto, so that the setting angle of the setting plane 19 can be modified compared with the planes 10, 18. For the slightly resilient flexibility of the working member 8 or 9 transversely to the working plane 10 the mounting part 28 can act as a spring a tin.

As the head part 7 is open over its entire width and laterally over more than the height of the working part 8, 9 or the working face 13 up to the inside of the mounting part 28 facing the working plane between the working face 13 and the working member 9, chips can run out laterally from the working surface in a very adequate manner. It is also possible for there to be a good run off of chips along the rounding of the partition 29, the inside of the mounting part 28 and over the recess circumference of the working member 9 along the partition 31 or along the convex side of the working member 9 facing the working member 8.

Figures 4, 5, 6, 7, 8:
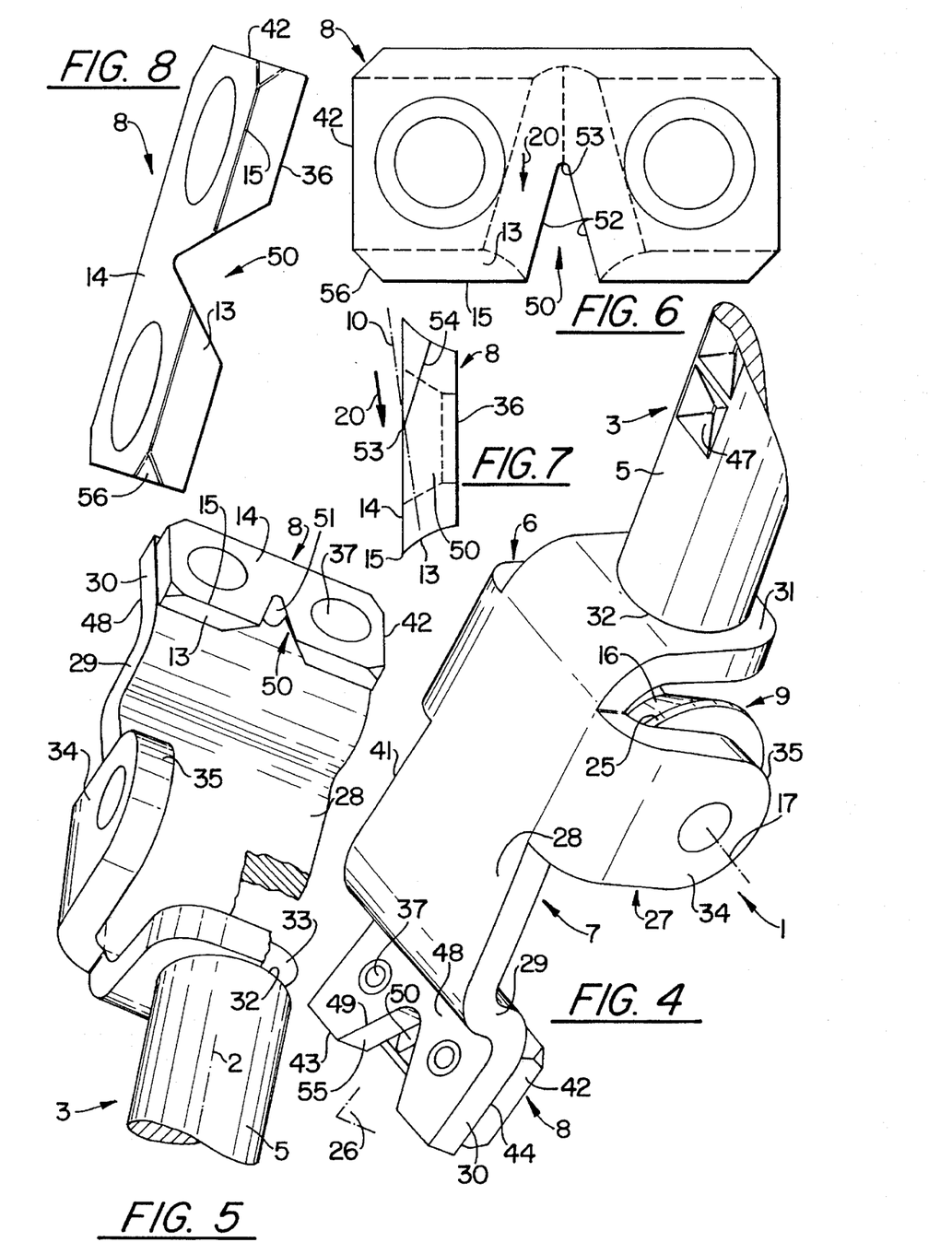
FIG. 4 a section of a further tool in a perspective view on the top side.
FIG. 5 the tool according to FIG. 4 in a perspective view on the underside.
FIG. 6 a further embodiment of a working member in a view on the working side.
FIG. 7 the working member according to FIG. 6 in cross-section.
FIG. 8 the working member according to FIGS. 6 and 7 in a view parallel to a working back face.

In the embodiment according to FIGS. 4 and 5 a bearing plate 28 is backwardly diminuted in its width extension from the off-setting section 29 up to the bearing shields 34 by an acute convergency of the lateral edge faces 41 so that the clear distance between the carrying shields or end plates 34 is about the same as the working width extension 40 of the working member 8 and the axial extension of the working member 9 is smaller with respect thereto, namely roughly about one sixth. The working member 9 can be made from varying materials, for example metal, plastic or the like, whereby its surfaces coming into contact with the workpiece appropriately have a lower hardness than the workpiece for avoiding scratching damages on the workpiece's surface. The working member 8 can also be fixed on the bearing members 30 back face 48 remote from the contact face 44 with the same fixing means 37 to achieve different cutting angles for deburring different materials.

According to FIGS. 4 to 8 in each case the working member 8 and the carrying section 30 provide an opening or cutout 50 resp. 49 spacedly located between the lateral edge faces 42 substantially symmetrical with respect to the central plane 26, in plane view on the working face 14 this cutout being acute angled V-shaped, whereby the flank angle of the cutout 49 is larger than the flank angle of the cutout 50. The V-shaped cutout 49 has a concavely rounded point, diverges towards the frontal transverse edge 43 and is marginally open at this edge face 43 in the vicinity of its largest width extension. The V-shaped cutout 50 provides with respect thereto a point concavely rounded with a smaller radius, diverges towards the working face 13 and is marginally open at this face 13 in the vicinity of its largest width extension and is also widened towards the face 36 over the entire cutout depth, so that at this face 36 the cutout reaches to both edges faces 13. This working member 8 is substantially thinner than the one according to FIGS. 1 to 3, whereby its thickness extension corresponds to about only one fourth up to a fifth of the extension between the edge faces 13 and only about one eighth of the width extension between the edge faces 42. In the assembled state the cutouts 49, 50 reciprocally overlap each other with the zones connecting to and including the bottom zones such that a channel-like chip passage 51 is provided which goes through from the face 14 past the faces 36, 44 up to the face 48 and transverse to these faces, in plane view on these faces the passage 51 being free or open and effectively bounded substantially over the entire circumference, for example in a rhombus-shape. The material chips therefore can penetrate at the back face 48 of the carrying part 30.

In the plane of the working face 14 resp. the working edge 15 the flanks as well as the bottom zone 53 of the cutout 50 provide cutting edges, which in cross-sections have substantially the same acute angle as the working edge by being bounded from inclined flank faces 54 on the side remote from the working face 14, these flank faces 54 slopingly ascending towards face 36 resp. being reciprocally inclined in this cross-section at obtuse angles as can particularly be seen in FIG. 8. These flank faces 54 continuously pass in inclined orientation up to the working face 13 as well to the edge face remote therefrom and up to the face 36 with substantially constant width extension. On the contrary the flank faces 55 of the cutout 49 are oriented substantially at right angles with respect to at least one of the faces 14, 36. The inclined flank faces 54 provide the cutting back faces of the cutting edge sections 52, 53 and therefore provide chip guiding faces ascending at small angle. The largest width extension of the cutout 50 in the vicinity of the working edge 15 is substantially smaller than the length extension of this edge 15 resp. half or one fourth thereof, whereby the length extension of the remainder of the working edge 15 can correspond to about four times of the largest width extension of the cutout 50. The bottom zone 53 is located about in the middle between the edges faces 13 and the openings for the fastening members 37. The flanks connecting to the edges 52, 53 in inclined orientation provide a substantially V-shaped groove between the zone 53 and the edge face 13 remote from the opening 50, the individual flanks of this groove can be inclined with respect to one or both plate faces 14, 36 between about 35° and 55° in particular roughly 45°. The plate thickness extension of the working member 8 can correspond roughly with the thickness extension of the zones 28 to 31, 34. All described embodiments can optionally be combined with each other, whereby each structural member resp. each arrangement or means can be provided in only one single occurance or in a plurality.

The working face 13 can also be planar. The edge zones of the working edge 15 laterally outside connecting into the edge faces 42 and in each case provided by three transverse edges resp. faces 13, 14, 42 oriented roughly at right angles with respect to each other can be provided by flattenings 56 which reach into each of the named faces 13, 14, 52. Also thereby damages on the workpiece can be avoided whereby instead of flattenings 56 also spherically cap-shaped roundings are adequate.

I claim:

1. A tool (1) for material working on at least one workpiece (11) in at least one engagement area (21, 22) comprising:

a basic body (3) providing at least one holder (4) configured for grasping for operably holding said tool (1) and at least one working head (6) fixed to said holder, said at least one of working head providing at least at least one first working face and at least one second working face (13-15, 16) defining a supporting and working plane (10) when in working engagement with the workpiece (11), at least one of said working faces providing at least one machining face (13, 14, 16) defining at least one working zone (40) over which said machining face is machiningly engageable, apart from said machining face at least one of said working faces providing at least one supporting face (14, 16) for supporting said working head (6) on the workpiece (11) while performing an advance motion determining an advance direction (20) and while at least one of said machining face (13-15, 16) is in a machining engagement position, wherein said first and second working faces (13 to 15, 16) include means for machiningly applying said first working face (13-15) to the workpiece (11) in a plurality of continuously connecting machining engagement positions reciprocally displaced laterally to said advance direction (20) with respect to each succeeding position, wherein at least one of said supporting face (16) provides a recessed face having flanks (23) reciprocally oriented at a flank angle, said flank angle being larger than 90° to 100° and between substantially 110° and 140° at substantially 130°, said flanks (23) being substantially symmetrical on either side of a median plane (26) of said working zone (40) of at least one of said working member (8, 9), said median plane (26) being oriented substantially parallel to said advance direction (20).

2. The tool according to claim 1, wherein said tool (1) has at least one oblong rod shaft (5), said rod shaft having first and second ends and defining a shaft axis (2), said working head (6) connected at said first end to said rod shaft (5) such that said working head is not rotatable about said shaft axis.

3. A tool (1) for material working on at least one workpiece (11) in at least one engagement area (21, 22) comprising:

a basic body (3) providing at least one holder (4) for operably holding said tool (1) and at least one working head (6), said at least one of working head providing at least at least one first working face and at least one second working face (13-15, 16) defining a supporting and working plane (10) when in working engagement with the workpiece (11), at least one of said working faces providing at least one machining face (13, 14, 16) defining at least one working zone (40) over which said machining face is machiningly engageable, apart from said machining face at least one of said working faces providing at least one supporting face (14, 16) for supporting said working head (6) on the workpiece (11) while performing an advance motion determining an advance direction (20) and while at least one of said machining face (13-15, 16) is in a machining engagement position, wherein said first and second working faces (13 to 15, 16) include means for machiningly applying said first working face (13-15) to the workpiece (11) in a plurality of continuously connecting said machining engagement positions reciprocally displaced laterally to said advance direction (20) with respect to each succeeding position, while said first and second working faces (13-15, 16) continuously remain supported on the workpiece (11), wherein said at least one supporting face (14, 16) includes at least two spaced supporting faces (14, 16) reciprocally spaced in said advance direction (20), an area free from any supporting faces being provided between said spaced supporting faces (14, 16), said supporting faces including a closest supporting face (16) located closest to a cutting area (21) provided by said working faces (13-15, 16), a spacing between said closest supporting face (16) and said engagement area (21) being larger than at least one of an extension of at least one of said working member (8, 9) in said advance direction (20), a working width extension (40) of a cutting working member (8), and a working width extension of at least one of said supporting face (16), said spacing between said supporting face (16) and said cutting area (21) being between at least 10 and at the most 25 mm at substantially 15 mm.

4. The tool according to claim 1, wherein at least one of said working faces (13-15, 16) and at least one of said supporting faces (14, 16) is provided on at least one working member (8, 9), in the working engagement at least one of said supporting face (16) and at least one of said working member (8) being reciprocally substantially freely movable in at least one direction, at least one of said supporting face (16) being movable with respect to said basic body (3) for performing a running motion following the advance motion, at least one of said supporting face (16) being movably mounted for positionally laterally self-adapting between stop positions, with respect to said basic body (3).

5. The tool according to claim 1, wherein at least one of said supporting face (16) is has curvature of at least one axis where, at least one of said supporting face (16) convexly curved about an axis (17) transverse to said advance direction (20) for engaging the workpiece (11).

6. The tool according to claim 1, wherein at least one of said supporting face (16) is substantially curved about an axis substantially parallel to said advance direction (20), at least one of said supporting face (16) being at the most as wide as a working width of at least one of said machining face (13, 14) spaced from said at least one supporting face.

7. The tool according to claim 1, wherein at least one of said working face (16) is provided by at least one working member (9) movably mounted with a bearing (27) on said basic body (3).

8. A tool (1) for material working on at least one workpiece (11) in at least one engagement area (21, 22) comprising:

a basic body (3) providing at least one holder (4) for operably holding said tool (1) and at least one working head (6), said at least one of working head providing at least at least one first working face and at least one second working face (13-15, 16) defining a supporting and working plane (10) when in working engagement with the workpiece (11), at least one of said working faces providing at least one machining face (13, 14, 16) defining at least one working zone (40) over which said machining face is machiningly engageable, apart from said machining face at least one of said working faces providing at least one supporting face (14, 16) for supporting said working head (6) on the workpiece (11) while performing an advance motion determining an advance direction (20) and while at least one of said machining face (13-15, 16) is in a machining engagement position, wherein said first and second working faces (13 to 15, 16) include means for machiningly applying said first working face (13-15) to the workpiece (11) in a plurality of continuously connecting said machining engagement positions reciprocally displaced laterally to said advance direction (20) with respect to each succeeding position, while said first and second working faces (13-15, 16) continuously remain supported on the workpiece (11), wherein at least one working member (9) separate from said basic body is displaceably mounted in to and fro directions substantially parallel to said working zone (40) of at least one of said working face (13-15, 16), a diameter of at least one of said working member (9) being at the most as large as a central and a clear spacing from an adjacent one of said at least one working face (13-15).

9. The tool according to claim 1, wherein at least one of said working face is provided by at least one working member (8, 9), at least one of said working member (9) being mounted so as to be freely rotatable about an axis (17) oriented transverse to said advance direction (20) and substantially parallel to a longitudinal extension of a cutting edge (15) of said working zone (40), at least one of said working member (9) being located at an inside of at least one lateral bearing bracket (34) of said basic body (3).

10. The tool according to claim 1, wherein at least one working member (9) is provided and mounted on at least one side wall (34), a central axis (17) of at lest one of said working member (9) being eccentric to at least one of said side wall (34), said wall (34) having an edge (35) facing the working plane (10) which is rounded with a curvature axis positioned eccentrically traversely to working plane (10) with respect to central axis (17).

11. The tool according to claim 1, wherein said working faces include at least two reciprocally spaced working faces (14, 16) interconnected substantially by only a plate-like connecting part (28, 29, 30) of said basic body (3), at least one receptacle (34, 44) for at least one working member (8, 9) being connected to said connecting part (28, 29, 30).

12. The tool according to claim 1, wherein said working faces (13-15, 16) are provided on at least two first and second working members (8, 9) mounted on at least two first and second receptacles (44, 34), at least one connecting part (28, 30) integral with at least one of said receptacles interconnecting said first and second receptacles (34, 44), at least one of said connecting part (28, 30) and at least one of said receptacles (34, 44) being made from an initially flat material including sheet metal, at least one of said connecting part providing a freely projecting connecting part (38, 30), in the vicinity of at least one of said machining face (13-15), said freely projecting connecting part (28, 30) being located closer to said working plane (10) than in the vicinity of at least one of said supporting face (16) spaced from said machining face (13-15), at least one of said connecting part (28, 30) being at least partly located in a plane substantially parallel to said working plane (10) and having an offset 29 in the direction of working plane 10.

13. The tool according to claim 1, wherein over said working zone (4) said first working face (13-15) provides a substantially linearly continuous and substantially straight working edge (15), a substantially planar cutting edge back face (14), a cutting edge front face (13) having a reentrant chip guide, said first working face (13-15) covering a working width extension (40) of at least 5 to 10 mm and at substantially 12 mm, at least one of said second working face (16) providing a centering face for centering said second working face (16) with respect to the work piece (11).

14. The tool according to claim 1, wherein at least one of said working faces (13-15, 16) is provided by at least one working member (8, 9) separate from said basic body (3), at least one of said working member (8) being provided by a plate, at least one of said working member (8) sideways transverse to said advance direction (20) having a greater extension than at least one of parallel to said advance direction (20), and transverse to said working plane (10).

15. A tool (1) for material working on at least one work-piece (11) in at least one engagement area (21, 22) comprising:

a basic body (3) providing at least one holder (4) for operably holding said tool (1) and at least one working head (6), said at least one of working head providing at least at least one first working face and at least one second working face (13-15, 16) defining a supporting and working plane (10) when in working engagement with the workpiece (11), at least one of said working faces providing at least one machining face (13, 14, 16) defining at least one working zone (40) over which said machining face is machiningly engageable, apart from said machining face at least one of said working faces providing at least one supporting face (14, 16) for supporting said working head (6) on the workpiece (11) while performing an advance motion determining an advance direction (20) and while at least one of said machining face (13-15, 16) is in a machining engagement position, wherein said first and second working faces (13 to 15, 16) include means for machiningly applying said first working face (13-15) to the workpiece (11) in a plurality of continuously connecting said machining engagement positions reciprocally displaced laterally to said advance direction (20) with respect to each succeeding position, while said first and second working faces (13-15, 16) continuously remain supported on the workpiece (11), wherein at least one working member (8, 9) separate from said basic body (3) is provided at least one of said working member (8) providing at least one of said working faces (13-15) and being substantially only supported on said basic body (3) on a side (36) remote from said working plane (10), at least one of said working member (8) being fixed to said basic body (3) by at least one tension member (37) including a bolt and a countersunk head (39), laterally on at least one side at least one of said working faces (13-15, 16) extending substantially up to an associated lateral boundary plane (41) of said basic body (3), of at least one of said working member (8) an outer face oriented transverse to said advance direction (20) extending substantially up to a free end (43) of said basic body (3).

16. A tool (1) for material working on at least one work-piece (11) in at least one engagement area (21, 22) comprising:

a basic body (3) providing at least one holder (4) for operably holding said tool (1) and at least one working head (6), said at least one of working head providing at least at least one first working face and at least one second working face (13-15, 16) defining a supporting and working plane (10) when in working engagement with the workpiece (11), at least one of said working faces providing at least one machining face (13, 14, 16) defining at least one working zone (40) over which said machining face is machiningly engageable, apart from said machining face at least one of said working faces providing at least one supporting face (14, 16) for supporting said working head (6) on the workpiece (11) while performing an advance motion determining an advance direction (20) and while at least one of said machining face (13-15, 16) is in a machining engagement position, wherein said first and second working faces (13 to 15, 16) include means for machiningly applying said first working face (13-15) to the workpiece (11) in a plurality of continuously connecting said machining engagement positions reciprocally displaced laterally to said advance direction (20) with respect to each succeeding position, while said first and second working faces (13-15, 16) continuously remain supported on the workpiece (11), wherein at least one working member (8, 9) is provided, at least one of said working member (8, 9) providing at least one of said working faces (13-15, 16) and a reversible member having separate said working faces selectively forming said engagement area (21, 22) by mounting said working member in reciprocally turned positions, at least two working edges (15) having a common and substantially planar one of said working faces (14), in cross-section at least one of said working member (8) being substantially trapezoidal, at least one of said working member (8), having a fixing face (36) connecting to said basic body (3) in substantially whole-surface manner, said fixing face (36) of at least one of said working member (8) extending over substantially an entire working width extension (40) of said working member (8, 9), in said advance direction (20) said fixing face (36) of at least one of said working member (8) having a smaller extension than in a direction transverse said advance direction.

17. The tool according to claim 1, wherein said working faces (13-15, 16) are provided by at least one working member (8, 9) mounted on said working head (6) in at least one direction at least one of said working member being continuously adjustable with respect to said working head (6), said working member (8, 9) being lockable in each of said adjusted positions.

18. The tool according to claim 1, wherein said working faces include a working back face (14), at least one cutting insert (8) being provided, at least one of said cutting insert (8) having said working back face (14) and a contact face (36) remote from said back face (14), boundary planes parallel to said working plane (10) being defined for a support member (9) separate from said cutting insert (8), said contact face (36) of said cutting insert (8) being at least partly located between said boundary planes, said working back face (14) being set back towards a median longitudinal axis (2) of said tool (1) with respect to a supporting plane (18) defined by said at least one supporting face (16) and oriented parallel to aid median longitudinal axis (2), with respect to at least one of said working plane (10), and said supporting plane (18) said working back face (14) being oriented at an acute angel closing towards said supporting face (16), said h older (4) being located closer to said supporting face (16) than to said machining face (13-15).

19. The tool according to claim 1, wherein at least one of said machining faces (13-15) is provided on an end section of a connecting part (28-31) narrowly limited resiliently deflectable at said end portion (30) with respect to said supporting face (16).

20. The tool according to claim 1, wherein at least one of said supporting face (14-16) provides a working face including a non-cutting smoothening face for smoothening a surface (12) of the workpiece (11), in said advance direction (20) at least two of said first and second working faces (13-15, 16) being successively located, at least one of said supporting face (16) and a supporting body (9) being shielded on at least one side at a location juxtaposed in said advance direction (20) with at least one transverse wall (29, 31) of said basic body (3), with respect to said advance direction (20) at least one of said transverse wall (31) being located in front of said smoothening face (16).

21. A tool (1) for material working on at least one work-piece (11) in at least one engagement area (21, 22) comprising:

a basic body (3) providing at least one holder (4) for operably holding said tool (1) and at least one working head (6), said at least one of working head providing at least at least one first working face and at least one second working face (13-15, 16) defining a supporting and working plane (10) when in working engagement with the workpiece (11), at least one of said working faces providing at least one machining face (13, 14, 16) defining at least one working zone (40) over which said machining face is machiningly engageable, apart from said machining face at least one of said working faces providing at least one supporting face (14, 16) for supporting said working head (6) on the workpiece (11) while performing an advance motion determining an advance direction (20) and while at least one of said machining face (13-15, 16) is in a machining engagement position, wherein said first and second working faces (13 to 15, 16) include means for machiningly applying said first working face (13-15) to the workpiece (11) in a plurality of continuously connecting said machining engagement positions reciprocally displaced laterally to said advance direction (20) with respect to each succeeding position, while said first and second working faces (13-15, 16) continuously remain supported on the workpiece (11), wherein at least two of said working faces (13-15, 16) are reciprocally positionally substantially continuously adjustable in at least one of a direction parallel to said advance direction (20), and a direction transverse to said working plane (10), to vary the operational spacing between the working faces 13-15, 16) after which adjustment said working faces may be locked with respect to one another, said supporting face including a roller circumference (16) arcated around a roller axis (17).

22. The tool according to claim 1, wherein said basic body (3) is subdivided in the vicinity of said working head (6) into two head parts, each of said head parts carrying at least one of said first and second working faces (13-15, 16), said head parts being reciprocally adjustable by an adjusting device, said head parts being interconnected by at least one of a sliding guide, and a pivot zone.

23. A tool (1) for material working on at least one work-piece (11) in at least one engagement area (21, 22) comprising:

a basic body (3) providing at least one holder (4) for operably holding said tool (1) and at least one working head (6), said at least one of working head providing at least at least one first working face and at least one second working face (13-15, 16) defining a supporting and working plane (10) when in working engagement with the workpiece (11), at least one of said working faces providing at least one machining face (13, 14, 16)

defining at least one working zone (40) over which said machining face is machiningly engageable, apart from said machining face at least one of said working faces providing at least one supporting face (14, 16) for supporting said working head (6) on the workpiece (11) while performing an advance motion determining an advance direction (20) and while at least one of said machining face (13-15, 16) is in a machining engagement position, wherein said first and second working faces (13 to 15, 16) include means for machiningly applying said first working face (13-15) to the workpiece (11) in a plurality of continuously connecting said machining engagement positions reciprocally displaced laterally to said advance direction (20) with respect to each succeeding position, while said first and second working faces (13-15, 16) continuously remain supported on the workpiece (11), wherein said tool (1) has at least one oblong rod shaft (5) providing first and second ends, at least one of said working head (6) being located on said first end and a handle (4) being located on said second end of at least one of said rod shaft (5) of said basic body (3), at least one of said ends (32, 33) of at least one of said rod shaft (5) being set back with respect to at least one of said working faces (13-15, 16) in a longitudinal extension direction of said rod shaft (5), at least one of said working head (6) including a head part (7) of said basic body (3), said head part (7) carrying at least one of said working faces (13-15, 16) and providing a transverse wall (31) fixedly connecting said working head (6) with said first end of at least one of said rod shaft (5), said transverse wall (31) providing an end of said working head (6).

24. A tool (1) for material working on at least one work-piece (11) in at least one engagement area (21, 22) comprising:

a basic body (3) providing at least one holder (4) for operably holding said tool (1) and at least one working head (6), said at least one of working head providing at least at least one first working face and at least one second working face (13-15, 16) defining a supporting and working plane (10) when in working engagement with the workpiece (11), at least one of said working faces providing at least one machining face (13, 14, 16) defining at least one working zone (40) over which said machining face is machiningly engageable, apart from said machining face at least one of said working faces providing at least one supporting face (14, 16) for supporting said working head (6) on the workpiece (11) while performing an advance motion determining an advance direction (20) and while at least one of said machining face (13-15, 16) is in a machining engagement position, wherein said first and second working faces (13 to 15, 16) include means for machiningly applying said first working face (13-15) to the workpiece (11) in a plurality of continuously connecting said machining engagement positions reciprocally displaced laterally to said advance direction (20) with respect to each succeeding position, while said first and second working faces (13-15, 16) continuously remain supported on the workpiece (11), wherein said tool (1) provides at least one holder (4), at least one of said holder (4) being adjustable substantially parallel to said advance direction (20) with respect to at least one of said working faces (13-15, 16), locking means being provided for locking said holder (4) with respect to at least one of said working head (6), at least one of said holder (4) being adjustable relative to an end of a bearing shaft (5) non-adjustably fixed to at least one of said working head with a rivet head (33), an unlocking handle (46) for unlocking at least one of said holder (4) with respect to at least one of said working faces (13-15, 16) being located in the vicinity of at least one of said holder (4).

25. A tool (1) for material working on at least one work-piece (11) in at least one engagement area (21, 22) comprising:

a basic body (3) providing at least one holder (4) for operably holding said tool (1) and at least one working head (6), said at least one of working head providing at least at least one first working face and at least one second working face (13-15, 16) defining a supporting and working plane (10) when in working engagement with the workpiece (11), at least one of said working faces providing at least one machining face (13, 14, 16) defining at least one working zone (40) over which said machining face is machiningly engageable, apart from said machining face at least one of said working faces providing at least one supporting face (14, 16) for supporting said working head (6) on the workpiece (11) while performing an advance motion determining an advance direction (20) and while at least one of said machining face (13-15, 16) is in a machining engagement position, wherein said first and second working faces (13 to 15, 16) include means for machiningly applying said first working face (13-15) to the workpiece (11) in a plurality of continuously connecting said machining engagement positions reciprocally displaced laterally to said advance direction (20) with respect to each succeeding position, while said first and second working faces (13-15, 16) continuously remain supported on the workpiece (11), wherein in the vicinity of at least one of said working zone (40) at least one chip passage (51) is provided, at least one of said chip passage (51) being laterally flanked and oriented transverse to said working plane (10), at least one of said chip passage (51) extending from at least one of said working face (13-15) to at least one face (36, 48) remote from said at least one working face (13-15), at least one of said chip passage (51) being bounded by two openings (49, 50) of two superimposed structural members (8, 30), at least one of said openings providing a cutout (49, 50) marginally open.

26. A tool (1) for material working on at least one work-piece (11) in at least one engagement area (21, 22) comprising:

a basic body (3) providing at least one holder (4) for operably holding said tool (1) and at least one working head (6), said at least one of working head providing at least at least one first working face and at least one second working face (13-15, 16) defining a supporting and working plane (10) when in working engagement with the workpiece (11), at least one of said working faces providing at least one machining face (13, 14, 16) defining at least one working zone (40) over which said machining face is machiningly engageable, apart from said machining face at least one of said working faces providing at least one supporting face (14, 16) for supporting said working head (6) on the workpiece (11) while performing an advance motion determining an advance direction (20) and while at least one of said machining face (13-15, 16) is in a machining engagement position, wherein said first and second working faces (13 to 15, 16) include means for machiningly applying said first working face (13-15) to the workpiece (11) in a plurality of continuously connecting said machining engagement positions reciprocally displaced laterally to said advance direction (20), while said first and second working faces (13-15, 16) continuously remain supported on the workpiece (11), wherein said working faces (13-15) include at least one substantially sharp working edge (15) providing edge sections (15, 52, 53) in plan view on said working plane (10), at least two of said edge sections (15, 52, 53) interconnecting at an angle, on a side (36) remote from at least one of said working faces (14) at least one chip passage (51) including at least one chip guide (54) providing a depression, said at least one chip guide (54) rising at an inclined orientation, said at least one chip passage (51) providing first and second passage sections (54, 55), one behind the other with respect to a chip flowing direction said first passage section (54) being narrowed and said second passage section (55) being widened with respect to each succeeding position.

27. The tool according to claim 1, wherein means are provided to apply said tool (1) as a deburring tool for manually deburring workpiece edges (12).

28. A tool (1) for material working on at least one workpiece (11) in at least one engagement area (21, 22) comprising:

a basic body (3) providing at least one holder (4) for operably holding said tool (1) and at least one working head (6), said at least one of working head providing at least at least one first working face and at least one of second working face (13-15, 16) defining a supporting and working plane (10) when in working engagement with the workpiece (11), at least one of said working faces providing at least one machining face (13, 14, 16) defining at least one working zone (40) over which said machining face is machiningly engageable, apart from said machining face at least one of said working faces providing at least one supporting face (14, 16) for supporting said working head (6) on the workpiece (11) while performing an advance motion determining an advance direction (20) and while at least one of said machining face (13-15, 16) is in a machining engagement position, wherein at least one of said working faces (13-15, 16) and at least one of said supporting faces (14, 16) is provided on at least one working member (8, 9), in the working engagement at least one of said supporting face (16) and at least one of said working member (8) being reciprocally substantially freely movable in at least one direction, at least one of said supporting face (16) being movable with respect to said basic body (3) for performing a running motion following the advance motion, at least one of said supporting face (16) being movably mounted for positionally laterally self-adapting between stop positions, with respect. to said basic body (3), said machining face (13-15) rigidly connecting to a head base (7) movably bearing said supporting face (16).

29. A tool (1) for material working on at least one work-piece (11) in at least one engagement area (21, 22) comprising:

a basic body (3) providing at least one holder (4) for operably holding said tool (1) and at least one working head (6), said at least one of working head providing at least at least one first working face and at least one second working face (13-15, 16) defining a supporting and working plane (10) when in working engagement with the workpiece (11), at least one of said working faces providing at least one machining face (13, 14, 16) defining at least one working zone (40) over which said machining face is machiningly engageable, apart from said machining face at least one of said working faces providing at least one supporting face (14, 16) for supporting said working head (6) on the workpiece (11) while performing an advance motion determining an advance direction (20) and while at least one of said machining face (13-15, 16) is in a machining engagement position, wherein at least one working member (9) is provided and mounted on at least one side wall (34), a central axis (17) of at least one of said working member (9) being eccentric to at least one of said side wall (34).

30. A tool (1) for material working on at least one work-piece (11) in at least one engagement area (21, 22) comprising:

a basic body (3) providing at least one holder (4) for operably holding said tool (1) and at least one working head (6), said at least one of working head providing at least at least one first working face and at least one second working face (13-15, 16) defining a supporting and working plane (10) when in working engagement with the workpiece (11), at least one of said working faces, providing at least one machining face (13, 14, 16) defining at least one working zone (40) over which said machining face is machiningly engageable, apart from said machining face at least one of said working faces providing at least one supporting face (14, 16) for supporting said working head (6) on the workpiece (11) while performing an advance motion determining an advance direction (20) and while at least one of said machining face (13-15, 16) is in a machining engagement position, wherein said working faces include at least two working faces (14, 16) spaced with respect to each other and interconnected substantially by only at least one plate-like connecting part (28, 29, 30) of said basic body (3), at least one receptacle (34, 44) for at least one working member (8, 9) being connected to said connecting part (28, 29, 30), said connecting part (28, 29, 30) being located on a side of said first and second working faces (14, 16), said side being remote from said working plane (10).

31. A tool (1) for material working on at least one work-piece (11) in at least one engagement area (21, 22) comprising:

a basic body (3) providing at least one holder (4) for operably holding said tool (1) and at least one working head (6), said at least one of working head providing at least at least one first working face and at least one second working face (13-15, 16) defining a supporting and working plane (10) when in working engagement with the workpiece (11), at least one of said working faces providing at least one machining face (13, 14, 16) defining at least one working zone (40) over which said machining face is machiningly engageable, apart from said machining face at least one of said working faces providing at least one supporting face (14, 16) for supporting said working head (6) on the workpiece (11) while performing an advance motion determining an advance direction (20) and while at least one of said machining face (13-15, 16) is in a machining engagement position, wherein said working faces (13-15, 16 are provided on at least two first and second working members (8,9) mounted on at least two first and second receptacles (44, 34), at least one connecting part (28, 30) integral with at least one of said receptacles interconnecting said first and second receptacles (34, 44), at least one of said connecting part (28, 30) and at least one of said receptacles (34, 44) being made from an initially flat material including sheet metal, at least one of said connecting part providing a freely projecting connecting part (28, 30) in the vicinity of at least one, of said machining face (13-15) said freely projecting connecting part (28, 30) being located closer to said working plane (10) than in the vicinity of at least one of said supporting face (16) spaced from said machining face (13-15), at least one of said connecting part (28, 30) being at least partly located in a plane substantially parallel to said working plane (10).

32. A tool (1) for material working on at least one work-piece (11) in at least one engagement area (21, 22) comprising:

a basic body (3) providing at least one holder (4) for operably holding said tool (1) and at least one working head (6), said at least one of working head providing at least at least one first working face and at least one second working face (13-15, 16) defining a supporting and working plane (10) when in working engagement with the workpiece (11), at least one of said working faces providing at least one machining face (13, 14, 16) defining at least one working zone (40) over which said machining face is machiningly engageable, apart from said machining face at least one of said working faces providing at least one supporting face (14, 16) for supporting said working head (6) on the workpiece (11) while performing an advance motion determining an advance direction (20) and while at least one of said machining face (13-15, 16) is in a machining engagement position, wherein at least one working member (8, 9) separate from said basic body (3) is provided, at least one of said working member (8) providing at least one of said machining faces (13-15) and being supported on said basic body only with a single member side (36) located remote from said working plane (10), said working member (8) including said member side (36).

33. A tool (1) for material working on at least one work-piece (11) in at least one engagement area (21, 22) comprising:

a basic body (3) providing at least one holder (4) for operably holding said tool (1) and at least one working head (6), said at least one of working head providing at least at least one first working face and at least one second working face (13-15, 16) defining a supporting and working plane (10) when in working engagement with the workpiece (11), at least one of said working faces providing at least one machining face (13, 14, 16) defining at least one working zone (40) over which said machining face is machiningly engageable, apart from said machining face at least one of said working faces providing at least one supporting face (14, 16) for supporting said working head (6) on the workpiece (11) while performing an advance motion determining an advance direction (20) and while at least one of said machining face (13-15, 16) is in a machining engagement position, wherein a working member (8) is provided, said working member (8) providing said working faces (13-15) including two remote cutting edges (15) and a cutting back face (14) commonly bounding both said cutting edges (15), said working member (8) providing a reversible member having separate said cutting edges (15) selectively forming said engagement area (21) by mounting said working member (8) in reciprocally turned positions to said working head (6).

34. A tool (1) for material working on at least one work-piece (11) in at least one engagement area (21, 22) comprising:

a basic body (3) providing at least one holder (4) for operably holding said tool (1) and at least one working head (6), said at least one of working head providing at least at least one first working face and at least one second working face (13-15, 16) defining a supporting and working plane (10) when in working engagement with the workpiece (11), at least one of said working faces providing at least one machining face (13, 14, 16) defining at least one working zone (40) over which said machining face is machiningly engageable, apart from said machining face at least one of said working faces providing at least one supporting face (14, 16) for supporting said working head (6) on the workpiece (11) while performing an advance motion determining an advance direction (20) and while at least one of said machining face (13-15, 16) is in a machining engagement position, wherein said working faces (13-15, 16) are provided by at least one working member (8, 9), mounted on said working head (6) in at least one direction at least one of said working member being continuously adjustable with respect to working head (6), to establish adjusted positions, said working member (8, 9) being lockable in each of said adjusted positions.

35. A tool (1) for material working on at least one work-piece (11) in at least one engagement area (21, 22) comprising:

a basic body (3) providing at least one holder (4) for operably holding said tool (1) and at least one working head (6), said at least one of working head providing at least at least one first working face and at least one second working face (13-15, 16) defining a supporting and working plane (10) when in working engagement with the workpiece (11), at least one of said working faces providing at least one machining face (13, 14, 16) defining at least one working zone (40) over which said machining face is machiningly engageable, apart from said machining face at least one of said working faces providing at least one supporting face (14, 16) for supporting said working head (6) on the workpiece (11) while performing an advance motion determining an advance direction (20) and while at least one of said machining face (13-15, 16) is in a machining engagement position, wherein at least one of said machining faces (13-15) is provided on an end section of a connecting part (28-31) narrowly limited resiliently deflectable at said end section (30) with respect to said supporting face (16).

36. A tool (1) for material working on at least one work-piece (11) in at least one engagement area (21, 22) comprising:

a basic body (3) providing at least one holder (4) for operably holding said tool (1) and at least one working head (6), said at least one of working head providing at least at least one first working face and at least one second working face (13-15, 16) defining a supporting and working plane (10) when in working engagement with the workpiece (11), at least one of said working faces providing at least one machining face (13, 14, 16) defining at least one working zone (40) over which said machining face is machiningly engageable, apart from said machining face at least one of said working faces providing at least one supporting face (14, 16) for supporting said working head (6) on the workpiece (11)

while performing an advance motion determining an advance direction (20) and while at least one of said machining face (13-15, 16) is in a machining engagement position, wherein in the vicinity of at least one of said working zone (40) at least one chip passage (51) is provided, said at least one of said chip passage (51) being laterally flanked and oriented transverse to said working plane (10), said at least one chip passage (51) extending from at least one of said working face (13-15) to at least one face (36, 48) remote from said at least one working face (13-15), said at least one chip passage (51) being bounded by two openings (49, 50) of two superimposed structural members (8, 30), at least one of said openings providing a cutout (49, 50) marginally open.

37. A tool (1) for material working on at least one work-piece (11) in at least one engagement area (21, 22) comprising:

a basic body (3) providing at least one holder (4) for operably holding said tool (1) and at least one working head (6), said at least one of working head providing at least at least one first working face and at least one second working face (13-15, 16) defining a supporting and working plane (10) when in working engagement with the workpiece (11), at least one of said working faces providing at least one machining face (13, 14, 16) defining at least one working zone (40) over which said machining face is machiningly engageable, apart from said machining face at least one of said working faces providing at least one supporting face (14, 16) for supporting said working head (6) on the workpiece (11) while performing an advance motion determining an advance direction (20) and while at least one of said machining face (13-15, 16) is in a machining engagement position, wherein said working faces (13-15) include at least one substantially sharp working edge (15) providing edge sections (15, 52, 53) in plan view on said working plane (10), at least two of said edge sections (15, 52, 53) interconnecting at an angle, on a side (36) remote from at least one of said working faces (14) at least one chip passage (51) including at least one chip guide (54) providing a depression, at least one of said chip guide (54) rising at an inclined orientation, at least one of said chip passage (51) providing first and second passage sections (54, 55) one behind the other, with respect to a chip flowing direction said first passage section (54) being narrowed and said second passage section (55) being widened.

38. The tool according to claim 1, wherein said means for machiningly applying said first working face (13-15) to the workpiece (11) in a plurality of continuously connecting machining engagement positions reciprocally displaced laterally to said advance direction (20) is performed while said first and second working faces (13-15, 16) continuously remain supported on the workpiece (11) with respect to each succeeding position.

39. A tool (1) for material working on at least one work-piece (11) in at least one engagement area (21, 22) comprising:

a basic body (3) providing at least one holder (4) configured for grasping for operably holding said tool (1) and at least one working head (6) fixed to said holder, said at least one of working head providing at least at least one first working face and at least one second working face (13-15, 16) defining a supporting and working plane (10) when in working engagement with the workpiece (11), at least one of said working faces providing at least one machining face (13, 14, 16) defining at least one working zone (40) over which said machining face is machiningly engageable, apart from said machining face at least one of said working faces providing at least one supporting face (14, 16) for supporting said working head (6) on the workpiece (11) while performing an advance motion determining an advance direction (20) and while at least one of said machining face (13-15, 16) is in a machining engagement position, wherein at least one of said supporting face (16) provides a recessed face having flanks (23) reciprocally oriented at a flank angle, said flank angle being larger than 90° to 100° and between substantially 110° and 140° at substantially 130°, said flanks (23) being substantially symmetrical on either side of a median plane (26) of said working zone (40) of at least one of said working member (8, 9), said median plane (26) being oriented substantially parallel to said advance direction (20), wherein at least one working member (9) is provided and mounted on at least one side wall (34), a central axis (17) of at least one of said working member (9) being eccentric to at least one of said side wall (34), side wall (34) having an edge (35) facing the working plane (10) which is rounded with a curvature axis positioned eccentrical transversely to working plane (10) with respect to central axis (17).

* * * * *